United States Patent
Gee et al.

[11] Patent Number: 6,021,747
[45] Date of Patent: Feb. 8, 2000

[54] WATER COOLED VISCOUS FAN DRIVE

[75] Inventors: Thomas A. Gee, Allen Park; David A. Belfi; Richard W. Gibson, both of Royal Oak, all of Mich.

[73] Assignee: Eaton Corporation, Cleveland, Ohio

[21] Appl. No.: 09/024,036

[22] Filed: Feb. 16, 1998

[51] Int. Cl.[7] .................................................. F16D 35/02
[52] U.S. Cl. ........................... 123/41.12; 123/41.11; 123/41.46; 192/58.61; 192/58.63; 192/58.8
[58] Field of Search ............................ 123/41.11, 41.12, 123/41.46; 192/58.61, 58.63, 58.8

[56] References Cited

U.S. PATENT DOCUMENTS

| | | | |
|---|---|---|---|
| 2,838,244 | 6/1958 | Oldberg | 236/35 |
| 4,351,425 | 9/1982 | Bopp | 192/58 B |
| 4,351,426 | 9/1982 | Bopp | 192/58 B |
| 4,362,226 | 12/1982 | Gee | 192/58 B |
| 4,458,798 | 7/1984 | Bopp | 192/58 B |
| 4,556,138 | 12/1985 | Martin et al. | 192/58 B |
| 4,898,266 | 2/1990 | Garrett et al. | 192/21.5 |
| 5,030,865 | 7/1991 | Rockey et al. | 310/78 |
| 5,593,013 | 1/1997 | Yamauchi | 192/58.682 |

*Primary Examiner*—Willis R. Wolfe
*Assistant Examiner*—Brian Hairston
*Attorney, Agent, or Firm*—L. J. Kasper

[57] ABSTRACT

A fluid coupling assembly (11) in which the fluid coupling (43) is disposed within a coolant cavity (C) defined by an engine block (B) of an internal combustion engine. The fluid coupling includes an input coupling assembly (45) and disposed therein is an output coupling member (55), the input and output cooperating to define forward (61,65) and rearward (63,67) viscous shear areas to optimize torque capacity of the coupling. The input coupling assembly (45) includes a rearward body member (49) disposed within the cavity (C) and which includes impeller blades (73), such that the member (49) also serves as the water pump for the engine.

19 Claims, 6 Drawing Sheets

WATER COOLED VISCOUS FAN DRIVE

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE DISCLOSURE

The present invention relates to viscous fluid couplings, and more particularly, to such couplings which are used to drive vehicle radiator cooling fans, wherein the engagement or disengagement of the coupling is controlled in response to an input signal, which typically represents the temperature of the engine coolant.

In a typical viscous fluid coupling (viscous fan drive) of the type to which the present invention applies, an input shaft drives an input coupling member (clutch) which is received within an output coupling assembly, and torque is transmitted from the input to the output, in the presence of viscous fluid, by means of viscous shear drag. The coupling normally includes some sort of valving which controls the amount of viscous fluid within a viscous shear chamber, thereby controlling the ratio of the output torque and speed to the input torque and speed. Typically, the valving comprises a valve member which is moveable to cover or uncover a fill port disposed between a reservoir and the viscous shear chamber (operating chamber).

As is well known to those skilled in the art, the transmission of torque from an input coupling member to an output coupling member by means of viscous shear drag results in the generation of a substantial amount of heat. At least a major portion of such heat must be dissipated, or else the temperature of the viscous fluid will continue to increase, as the fan drive operates, until the fluid eventually breaks down (longer polymer chains break up into shorter polymer chains) and eventually, the viscosity of the fluid begins to decrease, as does its ability to transmit torque.

As is also well known to those skilled in the art, the coefficient of heat transfer of a heat generating device, such as a viscous fluid coupling, is on the order of fifty times greater when the device is surrounded by water than when it is surrounded by air. In other words, it would be possible to dissipate more heat from a viscous coupling, and therefore, transmit more torque through the coupling, if it were surrounded by water, instead of being disposed in the air stream rearward of the vehicle radiator, as in the conventional arrangement.

U.S. Pat. No. 2,838,244, assigned to the assignee of the present invention and incorporated herein by reference, discloses a fan drive system including an input pulley, a viscous fan drive, and a radiator cooling fan. In the system of the '244 patent, the viscous fan drive is disposed partially within the water pump cavity of an internal combustion engine. Unlike the conventional viscous fan drive, in the device of the '244 patent, the outer coupling member is the input, and the coupling member disposed therein comprises the output of the fan drive. The entire inside of the outer coupling member contains viscous fluid at all times, and the torque transmitted is varied by moving the output coupling member axially, thereby varying the viscous shear area. Such movement of the output coupling member occurs in response to temperature variations, by means of a wax pill. The input coupling assembly includes impeller blades, such that the rearward portion of the input coupling assembly comprises the engine water pump impeller.

Although it should be apparent to one skilled in the art that the general arrangement of the cited patent will provide substantially improved heat dissipation from the viscous coupling, applicant is not aware of any commercially produced viscous fan drive being made in accordance with the teachings of the cited patent.

It should be understood that the viscous fluid coupling of the present invention has, as an essential feature, that it be water-cooled, i.e., that it be cooled by the flow of engine coolant, and the terms "water" and "coolant" will be used interchangeably hereinafter, it being understood that the particular composition of the fluid is not an essential feature of the invention. It is also not an essential feature of the invention that the viscous coupling comprise the engine water pump, although the invention is especially advantageous when the viscous coupling and the water pump are combined, and therefore, the present invention will be described in connection with such an embodiment.

BRIEF SUMMARY OF THE INVENTION

Accordingly, it is an object of the present invention to provide a viscous fluid coupling having substantially increased heat dissipation capability, thereby permitting the coupling to transmit more nearly its optimum, possible torque for a particular coupling size.

It is a related object of the present invention to provide a viscous fluid coupling which may comprise a relatively smaller package, partly as a result of having a relatively smaller reservoir, for a given size of coupling, than was possible in prior art couplings.

It is another object of the present invention to provide an improved viscous coupling which, for any particular required output torque may be smaller and lighter, and have a substantially reduced "overhung" length.

It is an additional object of the present invention to provide an improved viscous fluid coupling of the type which may have electrical controls, wherein the controls may be simpler and less expensive than prior art electrical controls, and which eliminate the need for a conventional tether arrangement.

The above and other objects of the invention are accomplished by the provision of a fluid coupling assembly for use with an internal combustion engine of the type including an engine block defining an engine coolant cavity having a coolant inlet and a coolant outlet. The fluid coupling assembly includes an input pulley adapted to transmit input torque to an input coupling assembly of a fluid coupling device which is disposed at least partially within the engine coolant cavity. The fluid coupling device includes an output coupling member disposed within the input coupling assembly and includes means operable to transmit output torque to a radiator cooling fan. The fluid coupling device defines a fluid reservoir chamber and the input coupling assembly and the output coupling member cooperate to define a fluid operating chamber, whereby torque is transmitted from the input coupling assembly to the output coupling member in response to the presence of viscous fluid in the operating chamber. The input pulley is disposed forwardly of the fluid coupling device, and the radiator cooling fan is disposed forwardly of the input pulley.

The improved fluid coupling assembly is characterized by valve means disposed to separate the fluid reservoir chamber from the fluid operating chamber. The valve means defines a fluid inlet port and includes a valve member operable between a closed position blocking fluid flow through the fluid inlet port, and an open position, permitting fluid flow from the fluid reservoir chamber to the fluid operating chamber. A control means is operable in response to an input signal to move the valve member between the closed position and the open position.

DETAILED DESCRIPTION OF THE PREFERRED EMBODIMENT

Figure 1:
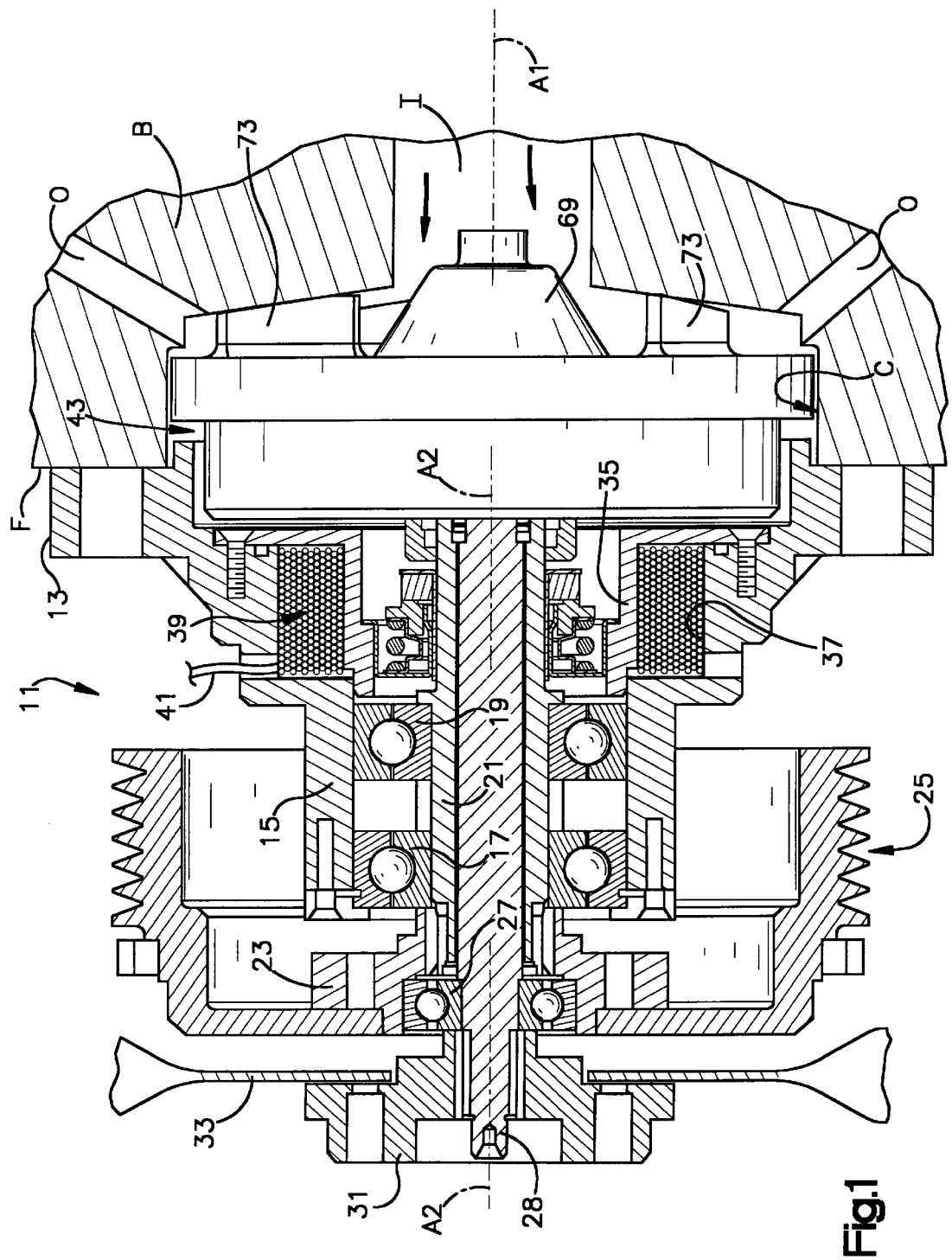
FIG. 1 is an axial cross-section of a fluid coupling assembly made in accordance with the present invention, installed in a vehicle engine block, shown only in fragmentary cross-section, with the fluid coupling device shown only in external plan view.

Referring now to the drawings, which are not intended to limit the invention, FIG. 1 is an axial cross-section of a fluid coupling assembly, generally designated 11, shown assembled to an engine block B of an internal combustion engine. The engine block B defines a front face F, disposed toward the vehicle radiator (not shown herein). The engine block B further defines an engine coolant cavity C which, in the subject embodiment, comprises the water pump cavity of the engine, although such is not an essential feature of the invention. As used herein, and in the appended claims, the term "engine block" will be understood to mean and include not only the actual block, but also, secondary housings associated with the block, or attached to the engine block, such as coolant manifolds, etc. It will be understood that, as used herein, the term "coolant" is not necessarily the vehicle engine coolant, but may refer simply to the fact that the fluid flowing through the cavity C serves as a coolant for the fluid coupling device to be described hereinafter.

The coolant cavity C defines an axis of rotation A1, which would typically be the axis of rotation of the impeller of the water pump. In open communication with the coolant cavity C, the engine block B defines a coolant inlet I and a coolant outlet O, the coolant outlet O being illustrated herein as two separate water passages communicating with the radially outer extent of the coolant cavity C. The particular configuration of the cavity C and the inlet I and outlet O is not an essential feature of the present invention, and what is shown herein is merely by way of example.

The fluid coupling assembly 11 includes a generally cylindrical housing member 13, which is adapted to be fixed to the front face F of the engine block B, such as by bolts (not shown herein), or other suitable fastening means. The housing member 13 includes a cylindrical shaft support portion 15. Disposed within the shaft support portion 15 is a pair of ball bearing sets 17 and 19, and rotatably supported therein is an input shaft 21. The forward end (left end in FIG. 1) of the input shaft 21 is splined to an insert member 23, to which is attached, by any suitable means, an input pulley 25, shown herein as being suitable for use with a typical poly V-belt.

Seated within an inner diameter of the insert member 23 is a ball bearing set 27, and rotatably supported therein is an output shaft 29. Attached to the forward end of the output shaft 29, such as by means of a key and keyway, is a fan hub member 31, to which is mounted a radiator cooling fan 33, shown only fragmentarily herein. The input shaft 21, to the pulley 25, the output shaft 29 and the cooling fan 33 all cooperate to define an axis of rotation A2, which is preferably substantially coincidental with the axis of rotation A1 of the cooling cavity C.

Disposed within the housing member 13, and just rearward of the bearing set 19 is an inner housing member 35 which is bolted to a rearward face of the housing member 13, and cooperates therewith to define a coil cavity 37. Disposed within the cavity 37 is an electromagnetic coil, generally designated 39, and extending radially out through an opening in the housing 13 is a pair of electrical leads, schematically shown at 41, which transmits an electrical input signal to the coil 39. The reference numeral "41" may also refer hereinafter to the input signal itself. It will be understood by those skilled in the art, that although the presence of the coil 39 is an important aspect of the controls, and that the controls are significant in the overall invention, the details of the construction of the coil 39 is not essential, and it is believed to be within the ability of those skilled in the art to select an appropriate coil assembly, based upon a reading and understanding of this specification.

Figure 2:
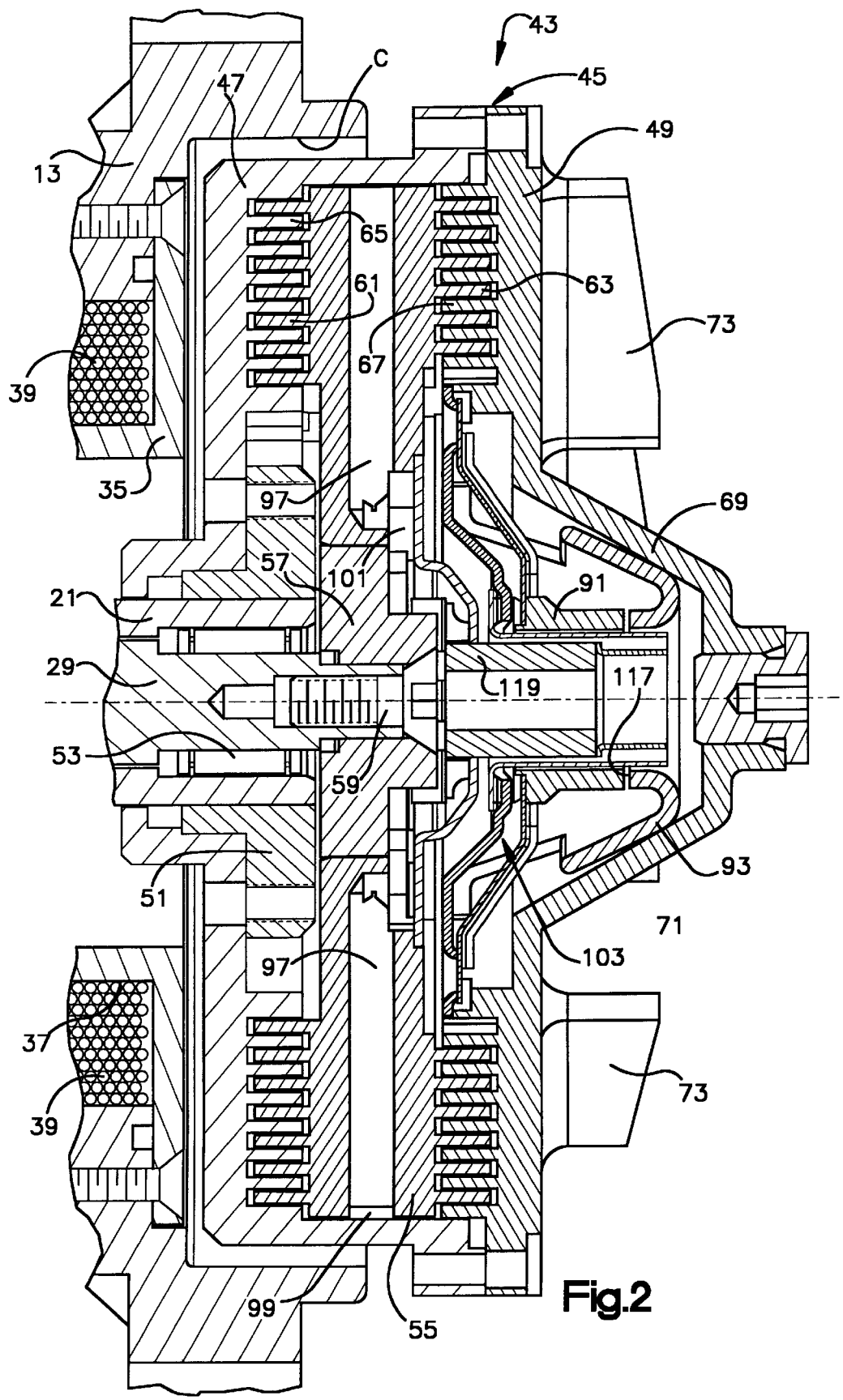
FIG. 2 is an enlarged, axial cross-section, similar to FIG. 1 but on a larger scale, and showing primarily the fluid coupling device, which is shown only in external plan view in FIG. 1.

As may be seen in FIG. 1, the coolant cavity C is actually defined by both the engine block B and the housing member 13, and during normal operation of the engine, coolant (typically, water plus ethylene glycol) will circulate throughout the cavity C. Disposed within the coolant cavity C is a viscous fluid coupling (fan drive), generally designated 43. Referring now primarily to FIG. 2, but also in conjunction with FIG. 1, the coupling 43 will be described in some detail, many of the details to be described comprising important aspects of the invention. The coupling 43 includes an input coupling assembly, generally designated 45, including a forward coupling body 47 and a rearward coupling body 49. It should be understood by those skilled in the art that the use herein, and in the appended claims, of terms such as "forward" and "rearward", as well as terms having similar import, is included mainly for clarity, as a way of indicating direction relative to the engine block B on the vehicle, but is not meant as a term of limitation.

The input coupling assembly 45, and specifically, the forward coupling body 47, is fixed to rotate with the input shaft 21 by means of an insert member 51, which may to preferably be press fit on the rearward end of the input shaft 21. Disposed radially between the rearward ends of the input shaft 21 and the output shaft 29 is a needle bearing set 53.

The viscous coupling 43 includes an output coupling member (clutch) 55 which is mounted on an insert member 57, and fixed to rotate therewith, the insert member 57 being attached to the rearward end of the output shaft 29 by any suitable means such as a keyway 58 in the output shaft 29 (see FIG. 5) receiving a key 57k formed integrally with the insert 57. Axial separation of the insert 57 from the shaft 29 may be prevented by any suitable means such as a machine screw 59. Thus, the output coupling member 55, the insert member 57, the output shaft 29, the hub member 31 and the cooling fan 33 all rotate at the same speed.

Figure 5:
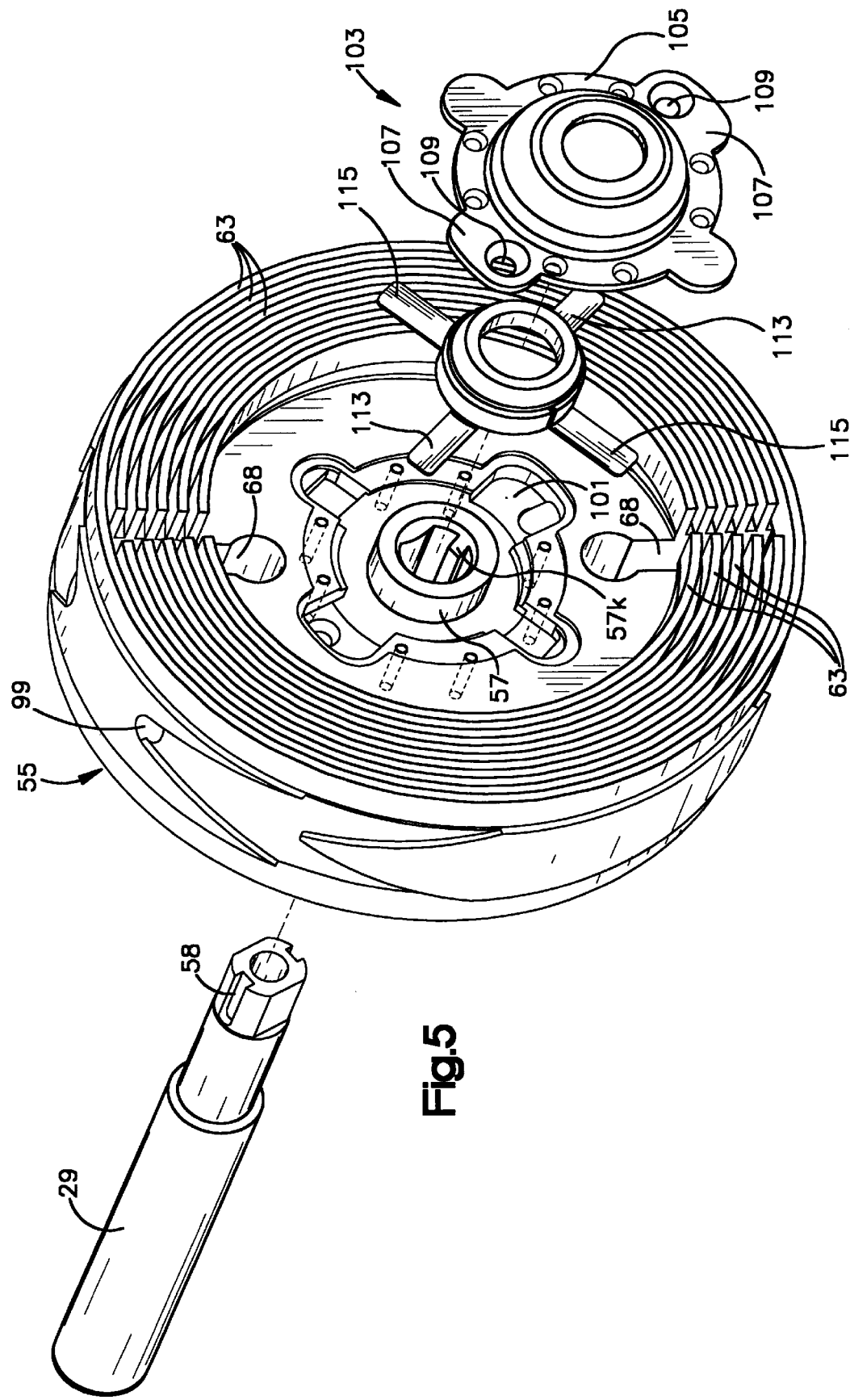
FIG. 5 is an exploded, perspective view of the output coupling member and bypass valve assembly, viewed from the right in FIG. 2.

In accordance with one important aspect of the present invention, the output coupling member 55 defines a plurality of annular forward lands 61, and a plurality of annular rearward lands 63 (see also FIG. 5). The forward coupling body 47 defines a mating plurality of annular forward lands 65, while the rearward coupling body 49 defines a mating plurality of annular rearward lands 67. The forward lands 61 and 65 are interdigitated to define a forward viscous shear chamber, and the rearward lands 63 and 67 are similarly interdigitated to define a rearward viscous shear chamber. The reference numerals "61,65" and "63,67" also are used hereinafter to refer to the forward and rearward viscous shear chambers, respectively. Preferably, the output coupling member 55 defines one or more passages 68 (see FIG. 5), whereby the forward and rearward viscous shear chamber are in fluid communication with each other, in a manner, and for a purpose well known to those skilled in the viscous coupling art.

Thus, it may be seen that the use of a forward and rearward land and groove viscous coupling may result in an optimum package, i.e., nearly the maximum possible torque output from the viscous coupling 43, for any given size of coolant cavity C. A related feature of the arrangement shown in FIG. 2 is that both of the viscous shear chambers are disposed immediately adjacent part of the coolant cavity C, such that cooling of the coupling device 43 may also be optimized. As is understood by those skilled in the art, increasing cooling of (or heat dissipation from) the viscous coupling 43 is a major factor in increasing the torque output capacity of the coupling.

In accordance with another important aspect of the present invention, the rearward coupling body 49 includes a reservoir-defining portion 69, which is shaped generally as the frustum of a cone. The portion 69 encloses a fluid reservoir chamber 71, and as is generally well known to those skilled in the art, it is the fluid in the reservoir chamber which has been heated, as a result of viscous shear drag, and it is desirable to transmit heat out of the fluid in the reservoir 71. Formed integrally with the rearward coupling body 49 is a plurality of impeller blades 73 (only two of which are shown in FIGS. 1 and 2, such that the coupling body 49 also comprises the impeller of the engine water pump.

Referring now also to FIG. 1, as the pulley 25 is rotated in a manner well known to those skilled in the art, the input coupling assembly 45 is also rotated at the same speed, and engine coolant drawn in from the coolant inlet I (see arrows), flows over the reservoir-defining portion 69, thus transmitting heat from the fluid in the reservoir chamber 71 to the engine coolant. The coolant then flows radially out as it is pumped by the impeller blades 73, and flows out through the coolant outlets O. Having a constant flow of coolant over the reservoir-defining portion 69 substantially improves the heat dissipation from the fluid in the reservoir chamber 71.

One of the problems with many conventional viscous fan drive installations is that the fan drive is driven by an input shaft extending axially out of the water pump, such that the weight of the rotating fan drive and far combination is an "overhung" mass which puts a substantial load on the water pump bearings, at certain operating speeds. However, the arrangement of the present invention puts the input pulley 25 between the fan drive 43 and the fan 33, and puts the fan drive within the water pump cavity C, so that the fan drive no longer constitutes an overhung load. Instead, with the present invention, only the fan hub member 31 and the fan 33 are overhung, relative to a portion of the assembly which is mounted more or less rigidly relative to the housing 13.

Figure 3:
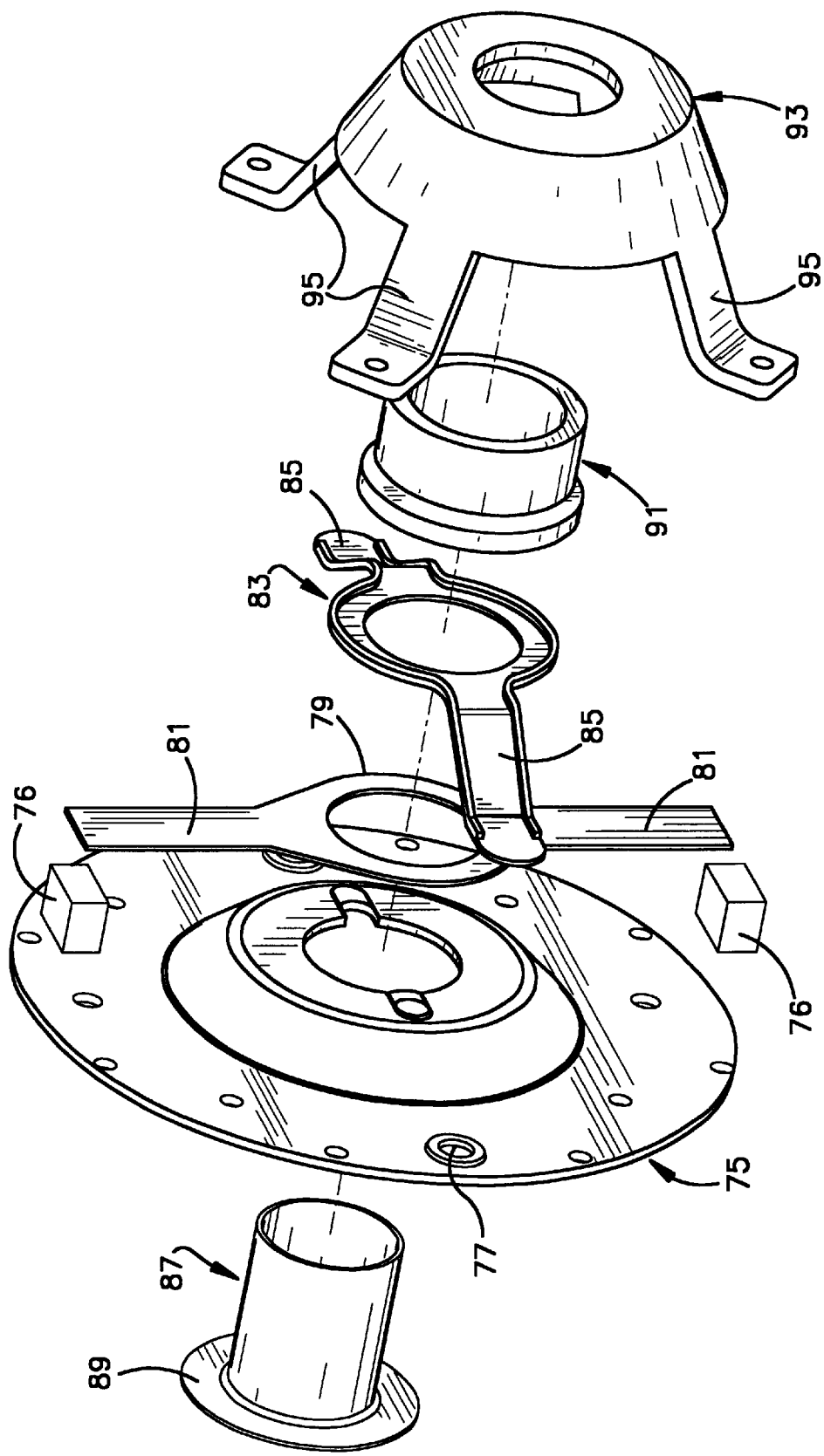
FIG. 3 is an exploded, perspective view of the valve assembly which comprises one aspect of the present invention.
Figure 4:
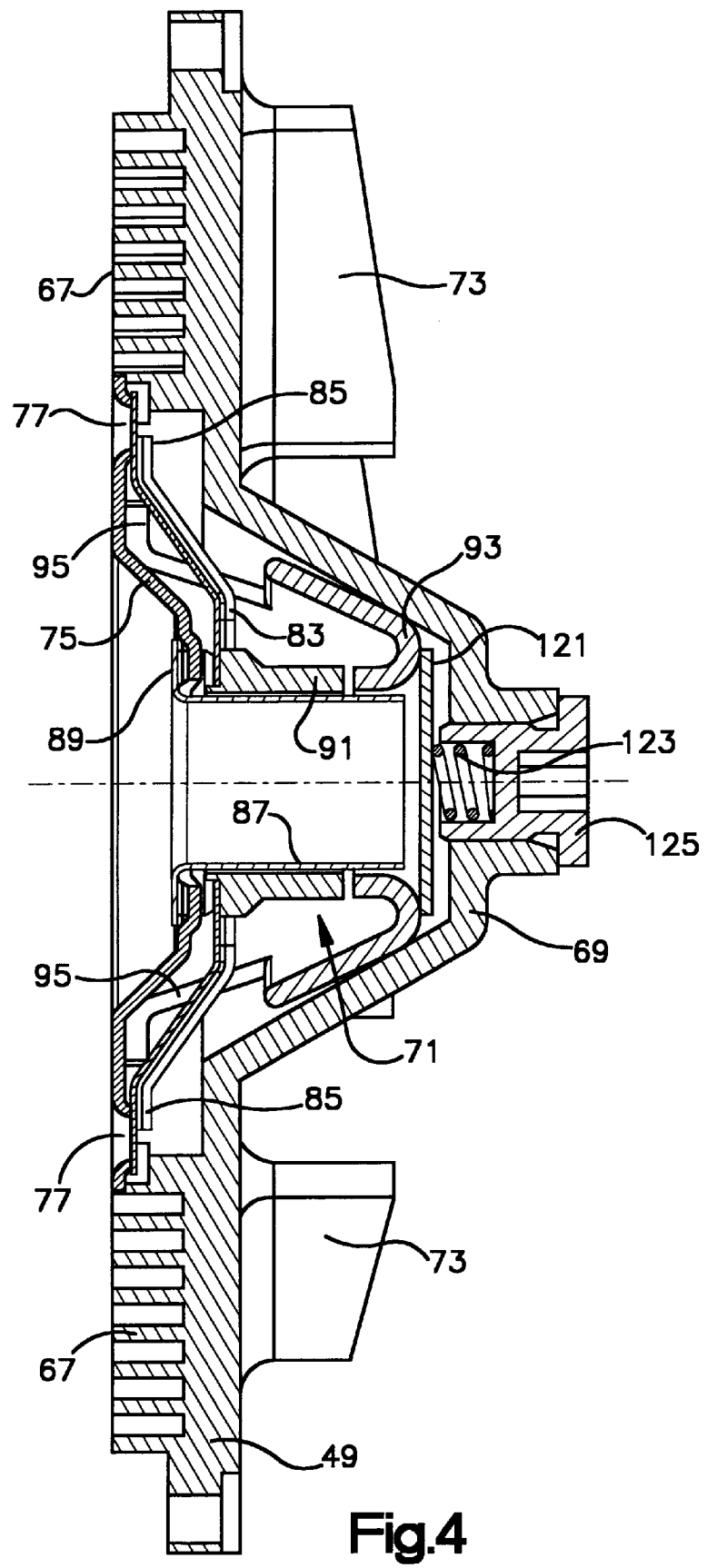
FIG. 4 is an axial cross-section, similar to FIG. 2, illustrating the assembly of the rear coupling body and valve assembly.

Referring now primarily to FIGS. 3 and 4, but also in conjunction with FIG. 2, the valving associated with the fluid coupling 43 will be described. Attached to a forward surface of the rearward coupling body 49, such as by a suitable rollover, is a reservoir cover 75 which, in the subject embodiment, defines a pair of diametrically opposite fill ports 77, only one of which is fully visible in FIG. 3. Disposed immediately adjacent the reservoir cover 75 is a pair of spacers 76, and in engagement therewith is a spring 79, shown herein as including an annular central portion, and a pair of diametrically opposite spring arms 81. It is the spring arms 81 which engage the spacers 76. The spacers 76 are included so that the spring 79 may comprise a flat member, without the spring arms 81 having to be bent to engage the adjacent surface of the reservoir cover 75. Disposed rearwardly of the spring 79 is a valve plate 83, including a pair of diametrically opposite valve arms 85, only one of which is fully visible in FIG. 3, but both of which are shown in FIG. 4. It should be noted that, when assembled, each valve arm 85 is offset ninety degrees from each spring arm 81, as shown in FIG. 3.

Disposed forwardly of the reservoir cover 75 is a cover sleeve 87, including a radially extending flange portion 89 which seats against a forward surface of the reservoir cover 75. The cylindrical portion of the cover sleeve 87 extends rearwardly through the openings in the cover 75, the spring 79 and the valve plate 83. Also surrounding the cover sleeve 87 is a valve plate sleeve 91. Disposed rearwardly of the sleeve 91 is a stop plate 93, the main portion of which is generally frusto-conical, but which also includes a plurality of legs 95, each of which may be attached to a rearward surface of the reservoir cover 75. The primary function of the stop plate 93 is to comprise part of the electromagnetic flux path (to be described subsequently) and limit rearward movement of the valve plate sleeve 91, under the influence of the electromagnetic lines of flux.

Referring again primarily to FIGS. 2 and 5, the output coupling member 55 defines one or more radial passages 97, each of which includes, at its radially outer periphery, a wiper surface 99 (shown only in the case of the radial passage 97 in the bottom half of FIG. 2). As is well known to those skilled in the art of viscous couplings, it is necessary to have some sort of wiper (pump) element so that, in response to the relative rotation of the input and output coupling members, a region of localized pressure build-up will occur, i.e., will occur at the wiper surface 99. As a result of the region of higher pressure at the surface 99, fluid will flow from the operating chamber radially inward through the passages 97 to an annular chamber 101 disposed rearwardly of the radially inner periphery of the coupling member 55. As is well known to those skilled in the art of viscous couplings, discharge of fluid being pumped from the operating chamber back to the reservoir chamber is normally accomplished through a passage defined by the cover of the coupling assembly (which is normally part of the output coupling assembly), and in a conventional coupling, such an arrangement is quite satisfactory. However, in the present invention, having discharge fluid flowing through a passage defined by the coupling assembly 45 would cause an increase in either the radial dimension of the coupling or the axial dimension of the coupling, or both. Moreover, the centrifugal forces opposing the fluid flow are less in the lower speed member, such that the pumping efficiency is improved by having the discharge flow through a passage defined by the coupling member 55. As mentioned previously, one of the objects of the invention is to put as much shear chamber as possible in the available coolant cavity C, such that increasing either the radial or axial dimension of the coupling assembly 45 would detract from optimizing the shear chamber. Therefore, the radial return passages 97, defined by the clutch 55, is an important feature in optimizing torque capacity of the coupling assembly of the invention.

Referring still primarily to FIGS. 2 and 5, disposed within the chamber 101, and attached to the output coupling member 55, is a bypass valve arrangement, generally designated 103. The assembly includes a cover member 105, adapted to be received within the chamber 101, and including a pair of diametrically opposite ears 107. Each ear 107 defines a bypass port 109, with each bypass port 109 being disposed adjacent the radially inner extent of its respective radial passage 97, as may best be seen in FIGS. 6 and 7. Disposed axially between the output coupling 55 and the cover member 105 is a bypass valve 111. The bypass valve 111 includes a pair of diametrically opposite valve arms 113 which are positioned to be able to cover the bypass ports 109 when the valve 111 is in the position shown in FIG. 6. The bypass valve 111 also includes a pair of diametrically opposite spring arms 115, shown only in FIG. 5, the function of which is to bias the bypass valve 111 toward the FIG. 6 position.

Referring again primarily to FIG. 4, seated against the rearward end of the stop plate 93 is a check valve 121, which may comprise a simple flat plate-like member. The check valve 121 is biased toward the closed position shown in FIG. 4 by a biasing spring 123 which may be seated within a recess in a plug member 125. The function of the check valve 121 is primarily to prevent "bleed-back" of fluid from the reservoir 71 into the operating chamber, such bleed-back being well known to those skilled in the art as causing "morning sickness", i.e., undesired engagement and noisy fan operation after the coupling has been idle for some time. It should be noted that in order to simplify the drawings, the check valve 121 is shown only in FIG. 4.

As noted previously, it is one important aspect of the invention that the overall package size of the viscous fluid coupling 43 be as small as possible, and one specific aspect of that objective is to minimize the size of the fluid reservoir 71. As is well known to those skilled in the viscous fan drive art, in conventional fan drives the reservoir is sized such that when it is disengaged, the fluid level in the reservoir will be below the center line (axis of rotation) of the fan drive, which substantially increases the overall size of the fan drive. However, with the design of the present invention, the entire annulus of the reservoir 71 may be filled with fluid, thus necessitating the check valve 121 to prevent bleed-back as noted above, but as a result, the reservoir may be much smaller than for a conventional fan drive of the same "fluid volume". In addition, by having the reservoir 71 full, or nearly full, when the coupling is disengaged, the heat dissipation from the fluid in the reservoir will be improved, because every part of the portion 69 will have fluid in contact with its inside surface as coolant flows over the outside of the portion 69.

Figure 6:
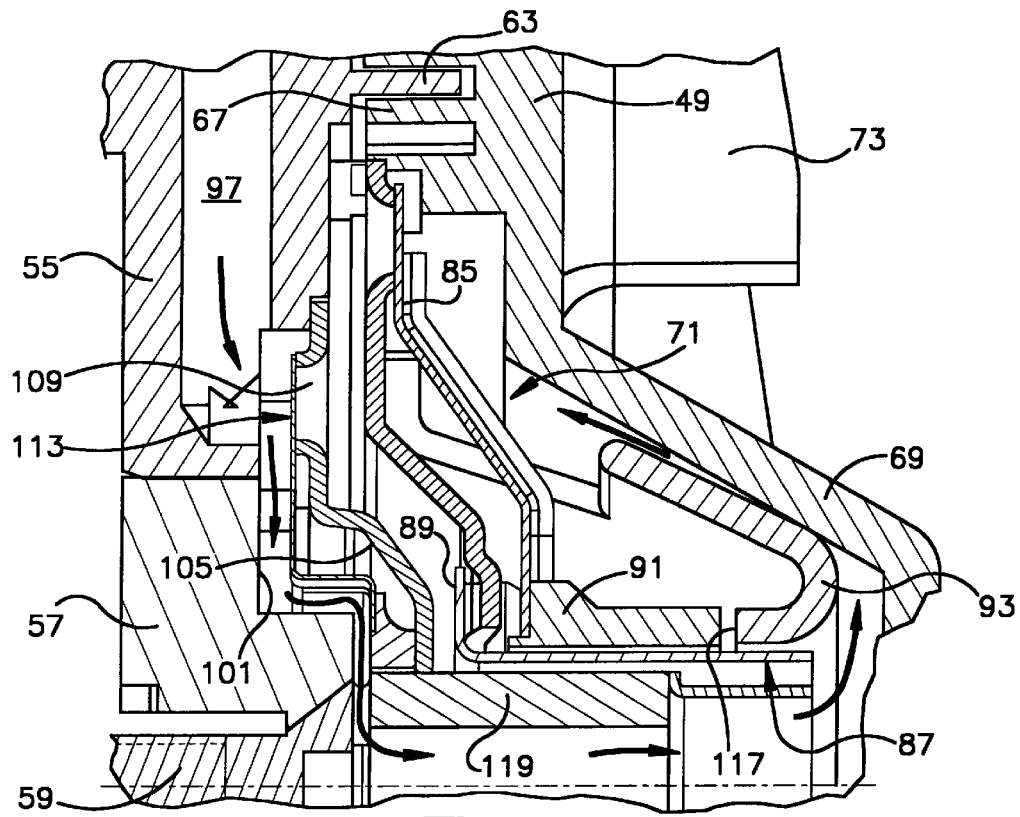
FIG. 6 is an enlarged, fragmentary, axial cross-section illustrating the operation of the valving of the present invention in its closed position.
Figure 7:
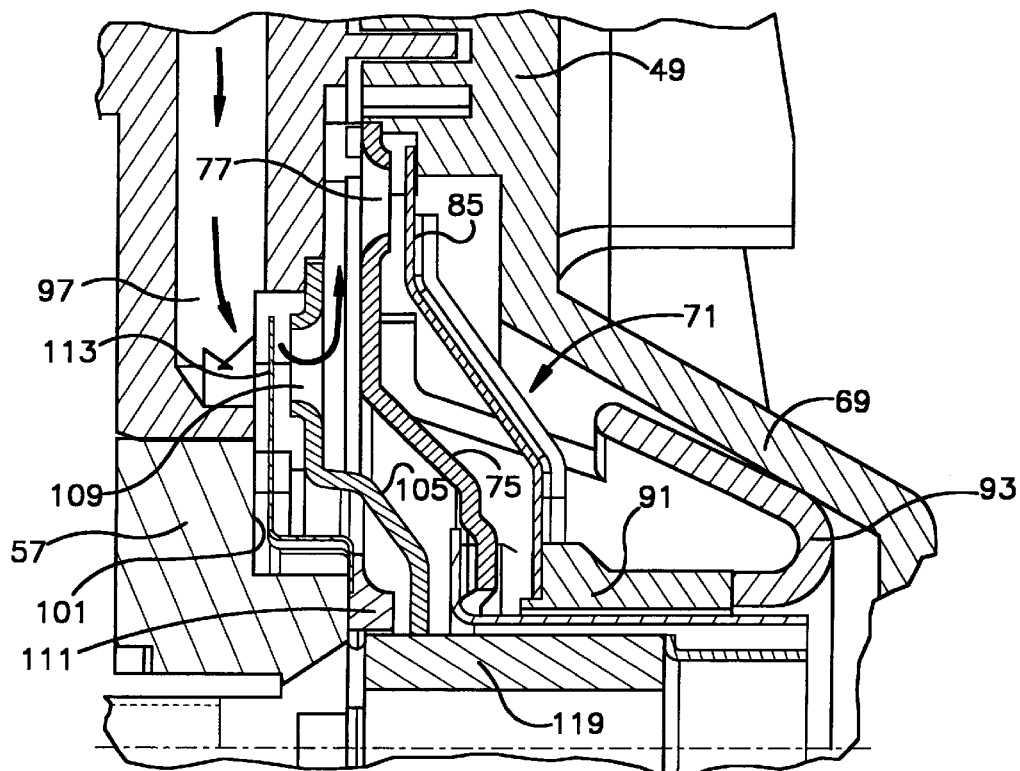
FIG. 7 is an enlarged, fragmentary, axial cross-section illustrating the operation of the valving of the present invention in its open position.

Referring now primarily to FIGS. 6 and 7, the operation of the invention will be described. In operation, and in the absence of an input signal 41 (FIG. 6), the valve plate 83 is normally biased forwardly by the spring 79, which also moves the valve plate sleeve 91 forward until it moves away from a forward surface 117 (see FIG. 2) of the stop plate 93, to the position shown in FIG. 6. In this condition, the valve arms 85 of the valve plate 83 cover the fill ports 77, and fluid is unable to flow from the reservoir chamber 71, through the fill ports 77, and into the operating chamber. This constitutes the "disengaged" condition (also referred to as "idle") of the viscous coupling 43, as is well known in the art. At the same time, the bypass valve 111 is biased to the position shown by the spring arms 115, and fluid flowing radially inward in the passage 97 (see arrows) enters the chamber 101, but cannot flow through the bypass ports 109 (which are blocked by the valve arms 113) or past the cover member 105. Therefore, fluid flows radially further inward, then flows through a gap at the forward end of a cylindrical ferrous member 119 (which is shown only in FIGS. 2, 6, and 7), then axially through the hollow member 119. The pressure of the flowing fluid unseats the check valve 121 (see FIG. 4), and finally, this discharge fluid flows radially outward between the rearward end of the stop plate 93 and the reservoir-defining portion 69, then axially therebetween in a generally forward direction, into the reservoir chamber 71. As was described previously, it is the flow adjacent the reservoir-defining portion 69 which provides an excellent opportunity for transfer of heat from the heated viscous fluid to the coolant flowing over the outer surface of the portion 69.

It is preferred that the fluid coupling assembly 11 of the present invention include a relatively large wiper surface 99, to generate a relatively large pump flow to achieve fairly fast pump-out of the operating chamber, thereby reducing fan noise whenever it is appropriate to go from the engaged mode to the disengaged mode. However, with a large pump flow, one concern is the possibility of "swamping" the fill ports 77 whenever it is necessary to again engage the coupling by moving the valve arms 85 and uncovering the fill ports 77. It is one important function of the bypass valve arrangement 103 to help prevent swamping of the fill ports, as will be described subsequently.

When it is desired to engage the viscous coupling 43, an input signal 41 is transmitted to the electromagnetic coil 39 (see FIG. 1), thus generating electromagnetic lines of flux in a manner generally well known in the art of such devices. In the subject embodiment, the lines of flux will be fairly concentrated in passing through the input shaft 21 and the output shaft 29. The flux lines will then pass through the ferrous insert member 57, and some lines of flux will also pass through the bypass valve 111, moving it forward into sealing contact with the rearward surface of the insert member 57. At least a portion of the lines of flux then pass through the cylindrical ferrous member 119 which is disposed within the cover sleeve 87. The flux lines passing through the member 119 then pass through the valve plate sleeve 91, exerting a force on the sleeve 91 tending to bias the sleeve 91 rearward, in opposition to the force of the spring 79, until the sleeve 91 engages the surface 117, and moves the valve arms 85 to a position uncovering the fill ports 77. Thus, as may best be seen in FIG. 7, fluid flows from the reservoir chamber 71 into the operating chamber, and after a time, as the fluid level increases in the operating chamber, the viscous coupling achieves its engaged condition.

At the same time, fluid which engages the wiper surface 99 is again pumped radially inward through the passage 97. However, with the coil 39 energized, the bypass valve 111 moves forward, as described above, thus blocking the flow path through the interior of the ferrous member 119. Instead, with the bypass valve 111 moved forward, the valve arms 113 uncover the bypass ports 109, such that discharge fluid flows through the ports 109, then flows radially outward through the chamber 101, re-entering the viscous chamber (operating chamber). Thus, as described previously, it is possible to have a very high pump-out rate without swamping the fill ports 77 when engaging the drive, because most of the fluid being pumped is merely recirculated back into the operating chamber.

The lines of flux which passed through the ferrous member 119 and sleeve 91, as well as other flux lines which passed through the insert 57, then pass through the engine block B, and then through the radially outer portion of the housing member 13 (assuming the housing member 13 is ferrous), and across the gap between the block B and the input pulley 25. Most of the flux lines are concentrated within the pulley 25, then pass through the insert member 23, then back into the input shaft 21 and the output shaft 29 to complete the electromagnetic circuit. The insert member 57 is preferably ferrous, while the bodies 47 and 49 and coupling 55 are typically non-ferrous (aluminum), thus helping to concentrate the lines of flux in the path described above, in an effort to achieve the maximum possible opening force on the valve plate 83, for the least current to the coil 39. Thus, it is important for the coupling assembly 11 of the invention to be designed to provide the best possible flux path, consistent with the various other objectives of the invention.

In the subject embodiment, and by way of example only, the energization of the coil 39 results in the valve 83 being moved to the open position as described. However, within the scope of the invention, the coupling assembly 11 could also be of the "coil-on, valve-closed" type (also known as being "fail-safe" because if the coil or electrical circuit fails, the coupling operates in the engaged condition, and the engine is "safe" from overheating). It is probably preferred to have the "coil-on, valve-open" arrangement illustrated and described herein, because the "duty cycle" of most fan drives, i.e., the percentage of time in the engaged condition, is typically quite low, for example, on the order of 5% or 10%. Therefore, energizing the coil to disengage the fan drive would require excessive electrical energy, and may not be acceptable to the customers.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

We claim:

1. A fluid coupling assembly for use with an internal combustion engine of the type including an engine block defining an engine coolant cavity having a coolant inlet and a coolant outlet; said fluid coupling assembly including an input pulley adapted to transmit input torque to an input coupling assembly of a fluid coupling device, said fluid coupling device being disposed at least partially within said engine coolant cavity; said fluid coupling device including an output coupling member disposed within said input coupling assembly, and including means operable to transmit output torque to a radiator cooling fan; said fluid coupling device defining a fluid reservoir chamber, and said input coupling assembly and said output coupling member cooperating to define a fluid operating chamber, whereby torque is transmitted from said input coupling assembly to said output coupling member in response to the presence of viscous fluid in said fluid operating chamber; said input pulley being disposed forwardly of said fluid coupling device and said radiator cooling fan being disposed forwardly of said input pulley; characterized by:

(a) valve means disposed to separate said fluid reservoir chamber from said fluid operating chamber;

(b) said valve means defining a fluid inlet port and including a valve member operable between a closed position blocking fluid flow through said fluid inlet port, and an open position, permitting fluid flow from said fluid reservoir chamber to said fluid operating chamber; and (c) control means operable in response to an input signal to move said valve member between said closed position and said open position.

2. A fluid coupling assembly as claimed in claim 1, characterized by said engine coolant cavity comprising a water pump cavity defining an axis of rotation substantially coincidental with an axis of rotation defined by said fluid coupling assembly.

3. A fluid coupling assembly as claimed in claim 2, characterized by said input coupling assembly including a forward body member and a rearward body member disposed within said water pump cavity and including a pump impeller operable, in response to rotation of said input coupling assembly, to pump engine coolant from said coolant inlet to said coolant outlet.

4. A fluid coupling assembly as claimed in claim 3, characterized by said coolant inlet being disposed on said axis of rotation of said water pump cavity, and said rearward body member including a reservoir-defining portion disposed generally concentrically about said axis of rotation of said fluid coupling assembly, said reservoir-defining portion being disposed within said water pump cavity, and enclosing therein a major portion of said fluid reservoir chamber.

5. A fluid coupling assembly as claimed in claim 4, characterized by said pump impeller being formed integrally with said rearward body member, said pump impeller including a plurality of impeller blades, disposed radially outward from said reservoir-defining portion, and being operable to direct engine coolant radially outward from said coolant inlet to said coolant outlet.

6. A fluid coupling assembly as claimed in claim 1, characterized by said input coupling assembly including a forward body member and a rearward body member disposed within said engine coolant cavity, and further characterized by an input shaft extending axially from said input pulley to said forward body member, and being operable to transmit said input torque thereto.

7. A fluid coupling assembly as claimed in claim 6, characterized by an output shaft comprising said means operable to transmit output torque from said output coupling member to said radiator cooling fan, said input shaft being hollow and said output shaft being disposed within said input shaft, and supported therein for rotation relative thereto.

8. A fluid coupling assembly as claimed in claim 7, characterized by a housing member being fixed relative to said engine block and comprising a forward enclosure for said engine coolant cavity, said housing member including a cylindrical shaft support portion concentric about said axis of rotation, and including bearing means disposed therein and rotatably supporting said input shaft.

9. A fluid coupling assembly as claimed in claim 1, characterized by said input coupling assembly including a forward body member and a rearward body member disposed within said engine coolant cavity, said output coupling member and said rearward body member cooperating to define a rearward viscous shear area.

10. A fluid coupling assembly as claimed in claim 9, characterized by said output coupling member and said forward body member cooperating to define a forward viscous shear area.

11. A fluid coupling assembly as claimed in claim 10, characterized by said rearward viscous shear area comprising a plurality of interdigitated lands and grooves, and said forward viscous shear area comprising a plurality of interdigitated lands and grooves.

12. A fluid coupling assembly as claimed in claim 10, characterized by said output coupling member defining at least one radial fluid passage, and including fluid pumping means, operable to pump fluid from said operating chamber radially inward through said radial fluid passage, said output coupling member including means operable to communicate fluid from said radial fluid passage to said fluid reservoir chamber.

13. A fluid coupling assembly as claimed in claim 12, characterized by said means operable to communicate fluid from said radial fluid passage to said fluid reservoir chamber includes a bypass valve assembly operable, when said valve member is in said closed position, to permit fluid flow from said radial fluid passage to said reservoir chamber, and when said valve member is in said open position, to permit fluid flow from said radial passage directly into said operating chamber.

14. A fluid coupling assembly as claimed in claim 1, characterized by a housing member being fixed relative to said engine block and comprising a forward enclosure for said engine coolant cavity, said control means including an electromagnetic coil disposed within said housing member, and surrounding an input shaft extending axially from said input pulley to said input coupling assembly.

15. A fluid coupling assembly as claimed in claim 14, characterized by an output shaft comprises said means operable to transmit output torque from said output coupling member to said radiator cooling fan, said input shaft being hollow and said output shaft being disposed within said input shaft, and supported therein for rotation relative thereto, said electromagnetic coil being operable to generate electromagnetic lines of flux passing axially through said input shaft and said output shaft.

16. A fluid coupling assembly as claimed in claim 15, characterized by said valve means includes means biasing said valve member toward one of said closed position and said open position, and further includes means operable, in response to the presence of electromagnetic lines of flux passing through said shafts, to move said valve member to the other of said open position and said closed position, in opposition, to the force of said biasing means.

17. A fluid coupling assembly as claimed in claim 16, characterized by said input coupling assembly includes a rearward body member defining said fluid reservoir chamber disposed within said engine coolant cavity, said valve means, including said valve member being disposed generally within said fluid reservoir chamber, and axially rearward of said output coupling member.

18. A fluid coupling assembly as claimed in claim 17, characterized by said input coupling assembly further includes a forward body member, said input shaft and said output shaft extending axially to a location disposed within said forward body member, said rearward body member and said forward body member both comprising non-ferrous materials.

19. A fluid coupling assembly as claimed in claim 18, characterized by said output coupling member comprises a non-ferrous material and includes a central insert comprising a ferrous material, said insert being fixed relative to said output shaft, to rotate therewith, said electromagnetic lines of flux passing axially through said insert.

* * * * *